United States Patent

[11] 3,545,787

| [72] | Inventor | Ronald Earl Miller<br>Rockford, Illinois |
|---|---|---|
| [21] | Appl. No. | 741,641 |
| [22] | Filed | July 1, 1968 |
| [45] | Patented | Dec. 8, 1970 |
| [73] | Assignee | Hendrickson Mfg. Co.<br>Lyons, Illinois<br>a corporation of Illinois |

[54] VEHICLE SUSPENSION
7 Claims, 6 Drawing Figs.

| [52] | U.S. Cl. | 280/104.5 |
|---|---|---|
| [51] | Int. Cl. | B60g 19/00 |
| [50] | Field of Search | 280/104.5(A) |

[56] References Cited
UNITED STATES PATENTS

| 3,241,856 | 3/1966 | Raidel | 280/104.5 |
|---|---|---|---|
| 2,980,439 | 4/1961 | Miller | 280/104.5 |

*Primary Examiner*—Philip Goodman
*Attorney*—Greist, Lockwood, Greenawalt & Dewey ABSTRACT: A tandem axle suspension system for road vehicles such as heavy-duty trucks, trailers, and the like, which is characterized by a pair of longitudinally extending load equalizing beams connecting the ends of the axle assemblies on opposite sides of the vehicle and pivotally mounted on saddle assemblies which are resiliently connected in depending relation with side frame members on the vehicle chassis and the equalizing beams each being formed in two sections with telescoping portions connected by resilient bushings on opposite sides of the pivotal connection with the respective saddle assembly.

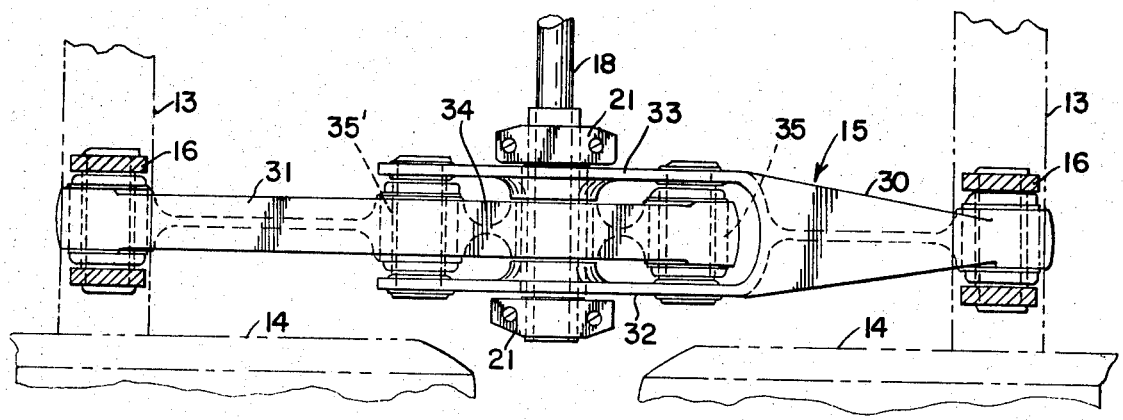
Fig. 4
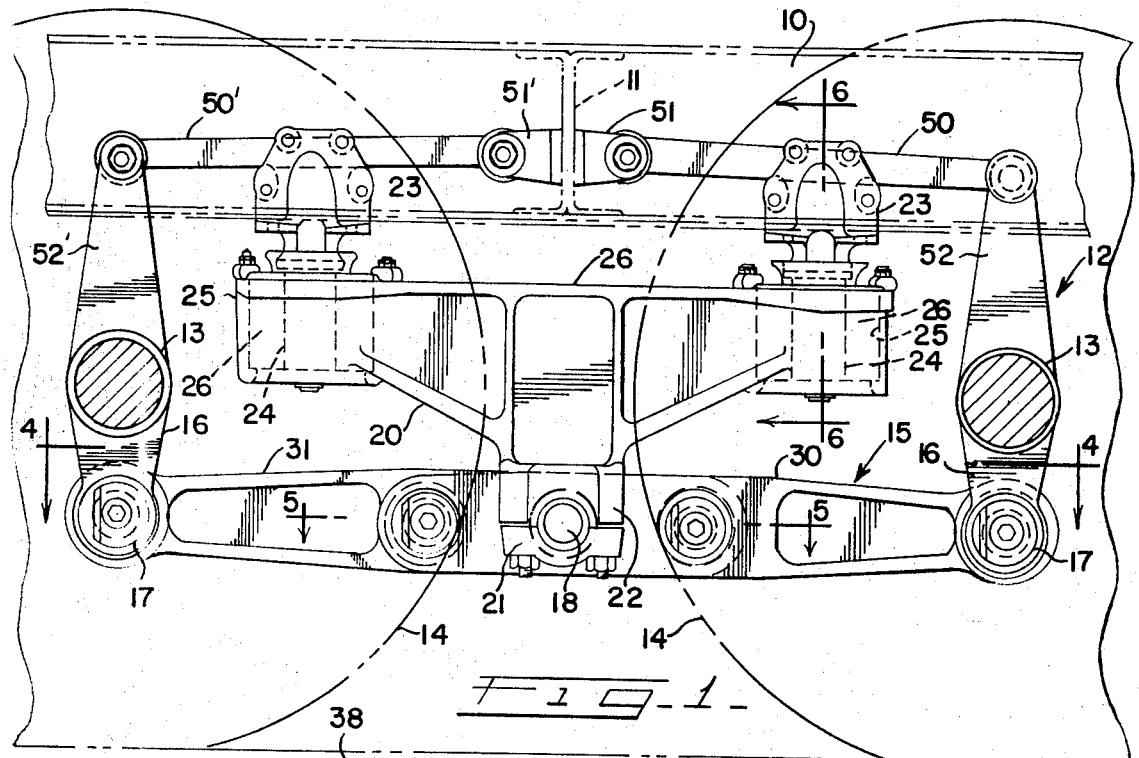
Fig. 1
Fig. 5
INVENTOR
RONALD EARL MILLER
BY
ATT'YS.

INVENTOR
RONALD EARL MILLER

VEHICLE SUSPENSION

This invention relates to suspension systems for vehicles such as trucks, trailers, or the like, and is more particularly concerned with improvements and innovations in a tandem axle suspension system which employs a pair of equalizing beam assemblies for interconnecting the ends of the axle assemblies on opposite sides of the suspension.

Tandem axle suspensions of the general type with which the present invention is concerned are shown, for example, in my U.S. Pat. No. 2,980,439 and R.T. Hendrickson U.S. Pat. Nos. 2,940,771 and 2,689,136. Suspensions of this type, which are in wide commercial use on heavy-duty trucks, semitrailers, and like vehicles, generally comprise fore and aft axle assemblies with dual ground wheels mounted on the outer ends thereof, a pair of equalizer beam assemblies interconnecting the ends of the axle assemblies on opposite sides of the suspension, saddle assemblies pivotally mounted on the equalizer beams midway between the opposite ends thereof, resilient connections suspending the saddle assemblies from the frame members, and a stabilizing center cross tube interconnecting the saddle assemblies. In these prior constructions the equalizer beams, frequently referred to as "Walking Beams", have generally been of relatively heavy, one piece rigid construction which results in the transmission of stress directly from one axle to the other when a wheel assembly drops into a hole or passes over an obstruction in the road or other surface over which the vehicle is traveling. In this type of suspension rigidity in the equalizing beams has been considered necessary in order to provide for the desired equalization or distribution of the load to the two axles. An object of the present invention is to provide an improvement in the structure of the equalizing beams so as to enable these elements to function at least to some degree as stress absorbing members without detracting from the principal function of equalizing the load on the axles.

A more specific object of the invention is the provision in a tandem axle suspension of the type described wherein a load-equalizing beam is connected at opposite ends to the axle assemblies and pivoted intermediate its ends to a saddle assembly, which equalizing beam is constructed so as to enable the beam to absorb some of the stress which in previous constructions is transferred from one axle directly to the other.

A still more specific object of the invention is to provide a tandem axle suspension wherein an equalizing beam is employed which is connected at its opposite ends to the corresponding ends of the axle assemblies and pivoted intermediate its ends to a saddle assembly suspended from the vehicle chassis, which equalizing beam is fabricated in two parts with telescoping sections in the middle of the beam which are connected to each other by resilient bushings on opposite sides of the center pivot.

These and other objects and advantages of the invention will be apparent from a consideration of the suspension system shown by way of illustration in the accompanying drawings wherein:

FIG. 1 is a side elevational view of the rear portion of a vehicle chassis frame having a rear axle suspension constituting an embodiment of the present invention;

FIG. 4 is a view taken on the line 4—4 of FIG. 1;

FIG. 5 is a sectional view taken on the line 5—5 of FIG. 1 with portions broken away.

Figure 2:
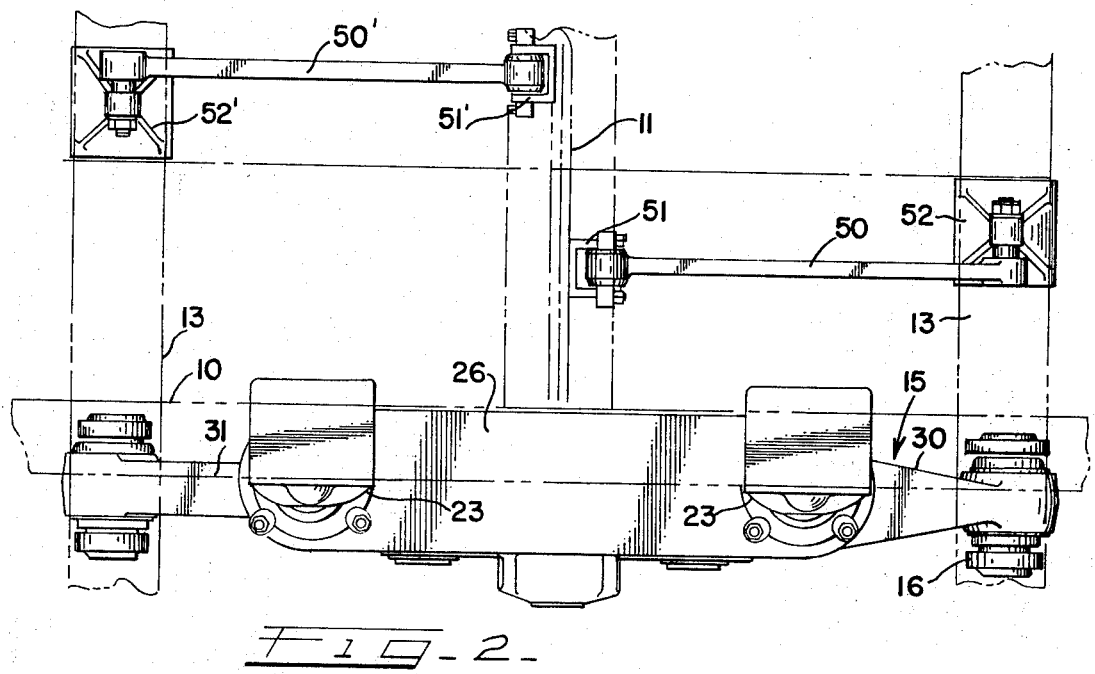
FIG. 2 is a fragmentary top plan view with portions omitted or in phantom line, the view showing one side of the embodiment of the suspension which is shown in FIG. 1.
Figures 3, 6:
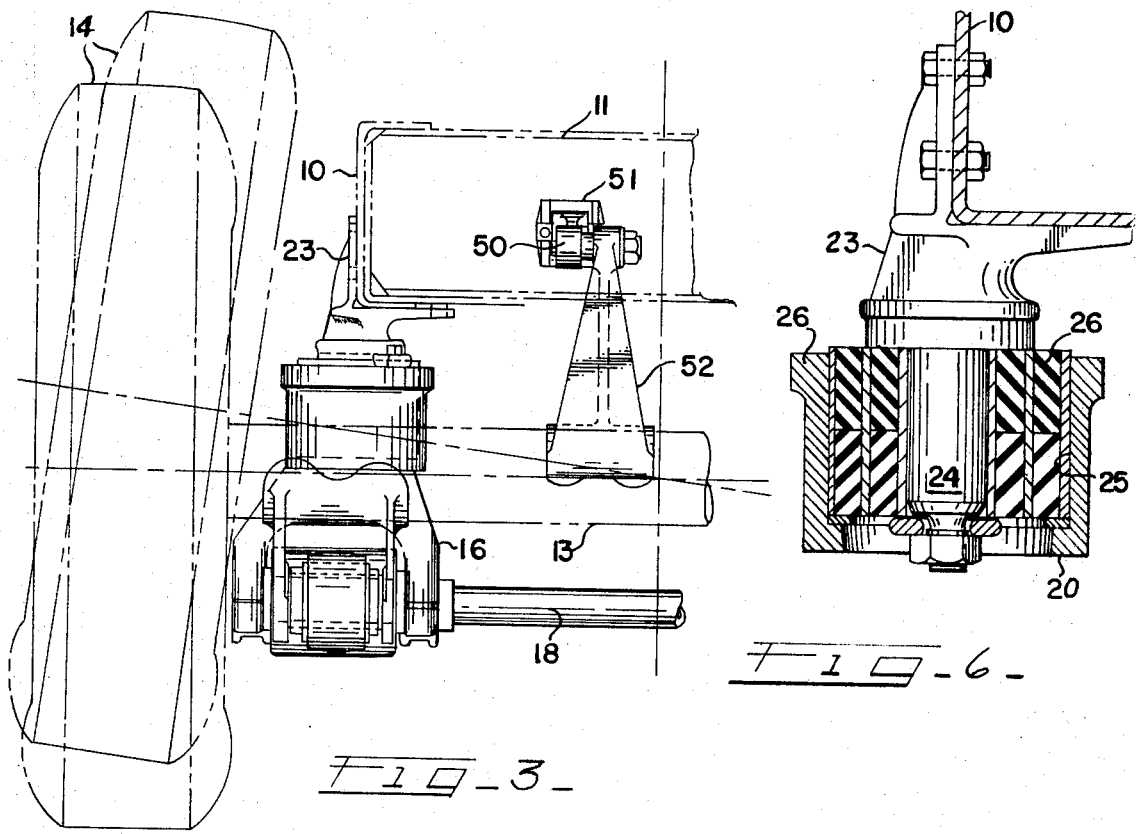
FIG. 3 is a partial rear end elevation of the suspension shown in FIG. 1.
FIG. 6 is a sectional view taken on the line 6—6 of FIG. 1.

Referring to FIGS. 1 to 3 of the drawings, the chassis or supporting frame of the vehicle may typically include a pair of longitudinal channel beams 10 with a connecting crossbeam 11, beneath which is located a tandem rear axle unit 12 which supports the rear end of the vehicle. The construction on one side of the vehicle is identical with that on the other side except that one is right handed and the other is left handed. Therefore, it will suffice to describe and show only one side of the tandem wheel support, it being understood that the other side corresponds.

A pair of tandem axle housings are indicated at 13, 13 which extend transversely underneath the chassis frame and which have ground-engaging wheels 14, 14 mounted on opposite ends thereof. The wheels 14, 14 may be of the dual type. Interiorally of each of the sets of wheels 14, 14 an equalizing beam assembly 15, generally referred to as a walking beam, is provided which extends between the adjacent ends of the axle housings 13, 13 and is pivotally supported or connected thereto by means of brackets or hangers 16, 16. The lower ends of the brackets 16, 16 are bifurcated so as to fit over eyes 17 formed on the opposite ends of each walking beam 15.

The walking beams 15 are pivotally connected intermediate their ends to saddles 20 depending from the frame side beams 10 and a cross-shaft 18 has a connection at each end with a saddle 20. The saddle 20 is provided with a removable bottom-bearing part 21 which mates with an upper-bearing part 22 integrally formed as part of the saddle 20. The mating and bearing parts 21 and 22 provide journal bearings by which the saddles are pivotally connected to the walking beam assemblies 15 with the end of the cross-shaft 18 passing through the center bushing of each of the walking beam assemblies 15 and extending across the unit and transversely of the chassis frame so that one shaft 18 serves both walking beams 15.

Each saddle member 20 is suspended from a side frame member 10 by a pair of bracket-forming members 23. The bracket members 23 each have a depending pin formation 24 which extends into a socket-forming bore 25 extending vertically at opposite ends of an elongate, flat, top surface 26 on the saddle member 20. The pin 24 is secured in the socket 25 with a resilient-bushing assembly 26 interposed between the pin 24 and the wall of the bore 25. This resilient bushing may be, for example, of the construction shown in my U.S. Pat. No. 2,980,439. Other connections, preferably of a resilient nature, may be employed to connect the saddle 20 in suspended relation with the chassis frame.

The equalizing beams or walking beam assemblies 15 are of special construction. Each of the beams 15 comprises two beam sections 30 and 31. The one section 30 which is on the right as viewed in FIG. 1, has its inner end bifurcated to provide two plate-like legs 32 and 33 which are disposed in parallel vertical planes and spaced apart a sufficient distance to accommodate the inner end portion 34 of the other beam section 31. The two beam sections 30 and 31 are connected in axially aligned relation by resilient-bushing assemblies 35 and 35' which are axially spaced on opposite sides of transversely aligned pivot holes 36, 36' in the parallel legs 32, 33 of beam sections 30 and hole 37 in the end 34 of the beam section through which the beam center-bushing assembly 38 for receiving the cross-shaft 18 extends. The cross-shaft 18 has a sliding fit into the beam center bushings 38 to keep the opposite hand saddles in alignment.

The resilient-bushing assemblies 35 and 35' are identical and only one thereof will be described. The assembly 35 comprises an outer metallic sleeve 41 seated in the bore 40 of the beam section 31 and an inner sleeve 42 between which there is interposed a cylindrical sleeve of rubber or similar resilient material 43. The assembly 35 is positioned in the hole 40 in the beam section with the ends of the inner sleeve 42 fitting between and against the inner faces of the parallel legs 32 and 33 and held in position by a pair of plug members 44, 44' clamped by the bolt 45 with the plug members having portions extending through the holes 39, 39' in the legs 32, 33 of the beam section 30 and into the ends of the inner sleeve 42. The sleeve 43 is grooved or recessed on its surfaces to receive the inner and outer metallic sleeves 40, 41 and prevent relative axial movement.

The beam 15 is preferably connected at its ends to the depending hangers 16 on the axle assemblies by resilient bushing assemblies of the same character as the assemblies 35 and 35' which are employed for connecting the two sections 30 and 31 of the beam 15. These connections allow some relative movement between the members and permit the two sections 30 and 31 of the equalizing beam to function at least in part as a stress-absorbing member so that when one of the wheel assemblies 14 drops into a hole or strikes a bump in the surface over which the vehicle is traveling at least part of the stress is absorbed by the connecting sleeve assemblies 35,35' between the two sections 30, 31 of the walking beam 15. The two part construction of the beam 15 with the resilient connections does not materially affect the functioning of the beam in the equalization of the load between the fore and aft axle assemblies which is transmitted through the pivotal connection with the saddle 20.

While specific resilient bushings are shown in the for of the invention which is illustrated, it is contemplated that other connections of an equivalent nature may be employed. Also, the saddle and associated elements for mounting the equalizing beams on the chassis frame may take some other form than that which is illustrated.

To complete the suspension assembly when the axles are driven so as to be subject to a rotational force, torque rods 50 and 51' may be employed which are pivotally connected at one end to brackets 51 and 51' secured on the crossbeam 11 and at the other end to the free ends of bracket members 52 and 52'. The torque rods may be of the character shown in my U.S. Pat. No. 2,983,555 or any equivalent form so as to stabilize the axle assemblies and prevent undesired rotation thereof.

In the form of the suspension shown, the connecting points between the two beam sections 30 and 31 are spaced equidistant on opposite sides of the connection of the beam 15 with the cross-shaft 18 and saddle assembly 20 but it is not necessary to have the two connecting points equidistant from the beam center connection. This spacing may be unequal in some installations.

While particular materials and specific details of construction are referred to in describing the illustrated form of the invention, it will be understood that other materials and equivalent structural details may be resorted to within the spirit of the invention.

I claim:

1. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, and said equalizer beam assemblies each being formed of interconnected beam sections which are normally substantially rigid and which operate as a unit for equalizing the load on the axle assemblies, and said beam sections being connected to each other by resilient pivot members spaced lengthwise of said beam assembly which are adapted to absorb at least a part of the stress which would otherwise be transferred between the axle assemblies when there is a change in the reaction to the axle load due to unevenness in the surface engaged by the ground wheels.

2. An axle suspension as set forth in claim 1 and said equalizer beam assemblies each comprising two beam sections, and said two beam sections having inner end portions resiliently connected at spaced points along the longitudinal axis of the beam assembly formed by said beam sections so as to have limited movement relative to each other when unequal stress is applied to opposite ends thereof.

3. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, and said equalizer beam assemblies each being formed of interconnected beam sections which operate as a unit for equalizing the load on the axle assemblies and which are constructed to absorb at least a part of the stress which would otherwise be transferred between the axle assemblies when there is a change in the reaction to the axle load due to unevenness in the surface engaged by the ground wheels, and said equalizer beam assemblies each comprising beam sections with the inner ends thereof extending on opposite sides of the connection with the saddle assembly and a resilient connection between the end of each said equalizer beam section and the associated equalizer beam section, which resilient connections are spaced from the connection of said equalizer beam with the saddle assembly in the direction of the longitudinal axis of said equalizer beam.

4. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, said equalizer beam assemblies each being formed of interconnected beam sections which operate as a unit for equalizing the load on the axle assemblies and which are constructed to absorb at least a part of the stress which would otherwise be transferred between the axle assemblies when there is a change in the reaction to the axle load due to unevenness in the surface engaged by the ground wheels, and said equalizer beam assemblies each comprising two beam sections having inner end portions in telescoping relation and resiliently connected at spaced points from the connection of said equalizer beam with the saddle assembly.

5. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting to the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, said equalizer beam assemblies each being formed of interconnected beam sections which operate as a unit for equalizing the load on the axle assemblies and which are constructed to absorb at least a part of the stress which would otherwise be transferred between the axle assemblies when there is a change in the reaction to the axle load due to unevenness in the surface engaged by the ground wheels, and said equalizer beam assemblies each comprising end sections having inner portions in telescoping relation with transversely extending pin and resilient sleeve connections spaced in the direction of the longitudinal axis thereof on opposite sides of the connection of said equalizer beam with the saddle assembly so as to permit limited relative movement of said end sections and to absorb stresses when an uneven supporting surface results in unequal reaction to the load on the axle assemblies.

6. An axle suspension as set forth in claim 5 and the connections between the equalizer beam sections being spaced on opposite sides of said pivotal connection with the saddle assembly.

7. An axle suspension for road which is disposed beneath the vehicle chassis frame, said suspension comprising a pair of parallel fore and aft axle assemblies with ground wheels on opposite ends thereof, a pair of equalizer beam assemblies having their ends connected by brackets to the ends of said axle assemblies on opposite sides of said suspension, saddle assemblies pivotally connected to the equalizer beams midway between the ends thereof, resilient connections between the saddle assemblies and the vehicle chassis frame at opposite sides thereof, and said equalizer beam assemblies each being formed of two interconnected beam sections which are normally substantially rigid and operate as a unit for equalizing the load on the axle assemblies, said two equalizer beam sections having end portions which are telescoping, and a resilient connection between the end of each of said equalizer beam sections and the associated equalizer beam section, which resilient connections are spaced on opposite sides from the pivotal connection between said equalizer beam and the associated saddle assembly.

UNITED STATES PATENT OFFICE
CERTIFICATE OF CORRECTION

Patent No. 3,545,787                Dated December 8, 1970

Inventor(s) RONALD EARL MILLER

It is certified that error appears in the above-identified patent and that said Letters Patent are hereby corrected as shown below:

Column 3, line 14, "for" should be -- form --

Column 4, line 68, after "road" insert -- vehicles --

Column 4, line 70, "for" should be -- fore --

Signed and sealed this 11th day of May 1971.

(SEAL)
Attest:

EDWARD M. FLETCHER, JR.
Attesting Officer

WILLIAM E. SCHUYLER,
Commissioner of Paten